(12) United States Patent
Yamane et al.

(10) Patent No.: US 6,579,642 B2
(45) Date of Patent: Jun. 17, 2003

(54) BATTERY DEVICE

(75) Inventors: Tetsuya Yamane, Takasaki (JP); Katsumi Hisano, Yokohama (JP); Tsutomu Matsui, Takasaki (JP); Kei Matsuoka, Kawasaki (JP); Hideo Iwasaki, Kawasaki (JP)

(73) Assignees: Toshiba Battery Co., Ltd., Tokyo (JP); Kabushiki Kaisha Toshiba, Kawasaki (JP)

( * ) Notice: Subject to any disclaimer, the term of this patent is extended or adjusted under 35 U.S.C. 154(b) by 51 days.

(21) Appl. No.: 09/984,835

(22) Filed: Oct. 31, 2001

(65) Prior Publication Data

US 2002/0028376 A1 Mar. 7, 2002

Related U.S. Application Data

(62) Division of application No. 09/463,180, filed as application No. PCT/JP99/02672 on May 21, 1999, now Pat. No. 6,335,116.

(30) Foreign Application Priority Data

May 21, 1998 (JP) ............................................ 10-140136

(51) Int. Cl.[7] ............................................. H01M 10/50
(52) U.S. Cl. ....................................... 429/120; 429/149
(58) Field of Search ................................. 429/120, 149, 429/151, 99, 100, 176

(56) References Cited

U.S. PATENT DOCUMENTS 5,456,994 A * 10/1995 Mita ............................ 429/71
5,560,999 A * 10/1996 Pedicini et al. ............... 429/27
5,879,831 A * 3/1999 Ovshinsky et al. ........... 429/54

FOREIGN PATENT DOCUMENTS

| JP | A8185899 | 7/1996 | |
| JP | A9289042 | 11/1997 | |
| JP | 10-21891 | * 10/1998 | ............ H01M/2/10 |
| JP | A10270095 | 10/1998 | |

* cited by examiner

*Primary Examiner*—Patrick Ryan
*Assistant Examiner*—R Alejandro
(74) *Attorney, Agent, or Firm*—Oblon, Spivak, McClelland, Maier & Neustadt, P.C.

(57) ABSTRACT

A battery device designed so that a plurality of battery modules (1) are arranged in rows at given spaces in a enclosure (2). Turbulence accelerators (5), such as dummy battery units or the like, are provided in a position on the uppermost-stream side of the enclosure in which air flows in the direction of arrangement of the battery modules. The heat transfer ability for the battery modules in the upper-stream position is enhanced by the turbulence accelerators which disorders the airflow introduced into the enclosure. Auxiliary coolant intake ports (7) for the introduction of a coolant are provided in the middle of an airflow path, whereby the heat transfer ability on the lower-stream side is enhanced, so that battery temperature differences between the battery units arranged in the enclosure can be restrained. Thus, a simple-construction battery device is realized enjoying improved quality and operation stability.

8 Claims, 5 Drawing Sheets

FIG. 5A
FIG. 5B
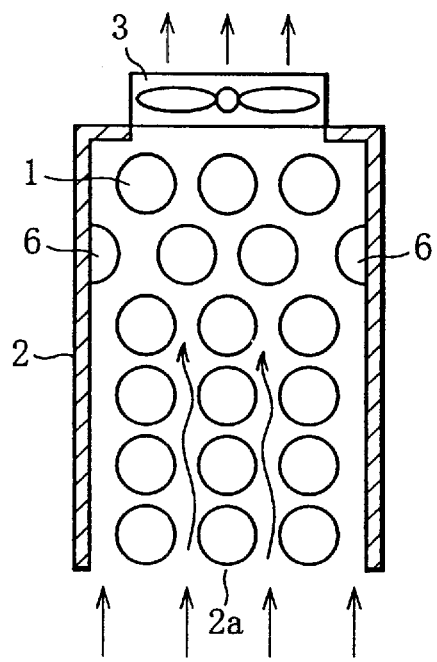
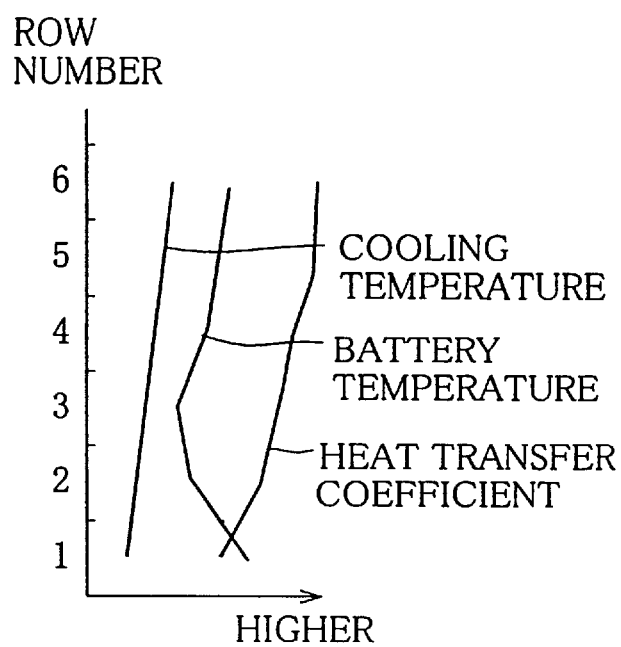
FIG. 6A
FIG. 6B
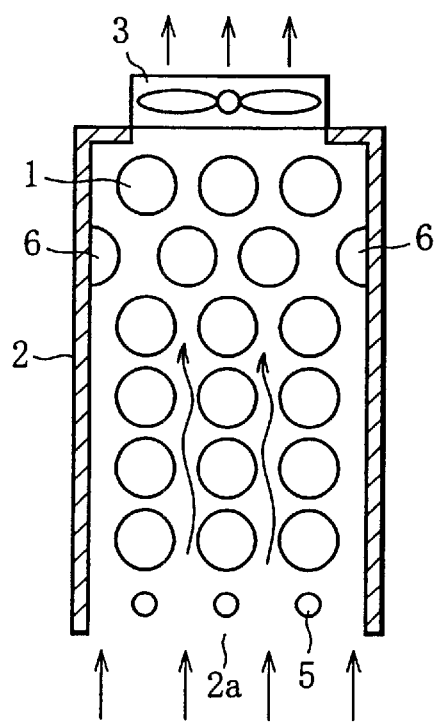
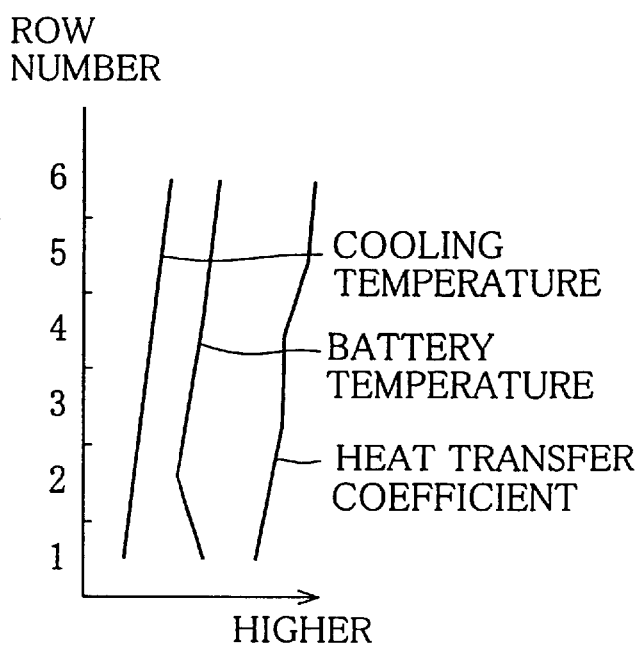

BATTERY DEVICE

This application is a Division of application Ser. No. 09/463,180 now U.S. Pat. No. 6,335,116 filed on Jan. 21, 2000, which was filed as International PCT Application No. PCT/JP99/02672, filed May 21, 1999.

TECHNICAL FIELD

The present invention relates to a battery device including a plurality of battery units, such as battery cells, battery modules, or battery packs, incorporated in a desired enclosure and adapted for use as a power source for an electric vehicle, for example.

BACKGROUND ART

Various attempts have been made to develop a battery device (battery assembly) for use as a driving energy source for an electric vehicle or the like, in which a plurality of battery units are connected in series and/or parallel with one another. Each battery unit is provided as a battery cell (single battery), a battery module formed of a plurality of battery cells connected in series with one another, or a battery pack including the battery module and an electronic circuit, such as a charge/discharge control circuit, incorporated therein.

In the case where a battery device is constructed by using a plurality of cylindrical battery modules 1 each comprised of battery cells connected in series with one another by welding or the like and externally covered by a protective heat-shrinkable tube, for example, these battery modules 1 are generally arranged at given spaces in a matrix in a box-shaped enclosure 2, as shown in FIG. 1. In this case, the enclosure 2 serves to receive and hold the battery modules 1 therein and to define therein an airflow path through which air (coolant or cooling medium) flows along the respective peripheral surfaces of the individual battery modules 1. In the battery device specifically shown in FIG. 1, the battery modules 1 are cooled by a forced air flow flowing between one and the other end openings of the enclosure 2 and produced by a fan 3 attached to the one end opening.

More specifically, as shown in the schematic plan view of FIG. 2A, the battery modules 1, e.g., 18 in number, are arranged at given spaces in the airflow direction in a 3-column, 6-row rectangular matrix in the enclosure 2. Air introduced through an opening 2a of the enclosure 2 is caused to flow along the respective peripheral surfaces of the battery modules 1 in the direction of arrangement thereof via the spaces between the battery modules 1 and between the wall of the enclosure 2 and the battery modules, whereby the battery modules 1 are cooled.

Although air (coolant) is forced to flow in the enclosure 2 in the above manner to cool the battery modules 1, there inevitably occur differences in battery temperature between the battery modules 1. The temperature differences may cause a variation in charge/discharge state and individual differences in battery life, residual battery capacity, etc. between the battery modules 1, thus arousing problems on quality and stability.

In order to minimize a temperature increase attributable to a charge or discharge action of the battery modules 1, thereby lessening the temperature differences between the battery modules 1, the rate of airflow produced by a fan 3 may be increased. Since pressure loss increases as the airflow rate increases, the fan 3 is expected be of a high-power, large-sized type, so that the battery device is large-scaled, and besides, there is a problem that constitutes a hindrance to energy conservation.

The present invention has been contrived in consideration of these circumstances, and its object is to provide a simple-construction battery device, capable of reducing battery temperature differences between a plurality of battery units arranged in an enclosure and enjoying improved quality and operation stability.

Another object of the present invention is to provide a simple-construction battery device in which a plurality of battery units arranged in an enclosure can be uniformly cooled without regard to their locations.

A further object of the present invention is to provide a battery device having a structure such that a plurality of battery units can be efficiently cooled by means of air that is introduced into an enclosure and caused to flow along the respective peripheral surfaces of the battery units.

DISCLOSURE OF THE INVENTION

The present invention is based on the following findings. In a battery device having therein a plurality of battery units arranged in rows at given spaces in an enclosure and a coolant flow path extending around the battery units in the direction of arrangement thereof, as shown by way of example in FIG. 2A, the temperature of air (coolant) that flows in the direction of arrangement of the battery units (battery modules) increases from the upstream side to the downstream side, as shown in FIG. 2B. Further, the ability of heat transfer (cooling efficiency) between air and the battery modules in the individual rows is low in the first row or on the uppermost-stream side of the airflow path and higher in a second row and its subsequent rows. In association with the coolant temperature and the cooling efficiency, the battery temperatures of the battery modules are low in the second and third rows and high in the first row.

Thus, the present invention is based on findings that the ability of heat transfer (cooling efficiency) between the coolant and the battery modules in the individual rows, including a plurality of battery units arranged in a multistage fashion, is associated intimately with turbulence of the coolant flow, and the heat transfer ability of the coolant flow for cooling the battery units increases in the second and subsequent rows with the increase in distance from the first row since the coolant flow is disordered by the battery units on the upper-stream side. In particular, the present invention is based on findings that the increase, observed between the first and second rows, of the heat transfer ability for the battery units is much greater than the increase of the ability of heat transfer between other rows, and that the coolant flows more positively from the first row to the second row than between other rows.

In a battery device according to the present invention, one or more turbulence accelerators, formed of dummy battery units, battery components such as capacitors, or dedicated cylindrical bodies, are provided in a position on the upper-stream side of the battery units disposed on the uppermost-stream side of the coolant flow path. Coolant flows (airflows) guided to the respective peripheral surfaces of the first-row battery units are disordered by the turbulence accelerators, thereby providing a battery device in which the heat transfer ability (cooling efficiency) for the first-row battery units is enhanced.

According to the present invention, moreover, there is provided a battery device constructed so that the battery units located in a plurality of rows on the upper-stream side of the coolant flow path are arranged in an in-line rectangular matrix, and the battery units located on the lower-stream side of the coolant flow path are arranged in a staggered triangular matrix, whereby the coolant flows can be disordered to a higher degree on the lower-stream side than on the upper-stream side so that the coolant temperature on the upper-stream side increases, and the heat transfer ability (cooling efficiency) for the battery units located on the lower-stream side is enhanced correspondingly.

According to the present invention, furthermore, there is provided a battery device constructed so that the arrangement pitch, as viewed in the coolant flow direction, of the battery units on the upper-stream side of the coolant flow path is shorter than the arrangement pitch, as viewed in the coolant flow direction, of the battery units on the lower-stream side of the coolant flow path. In other words, there is provided a battery device constructed so that the coolant temperature on the lower-stream side is increased by widening the arrangement pitch of the battery modules on the lower-stream side, whereby the heat transfer ability (cooling efficiency) on the lower-stream side is enhanced correspondingly.

According to the present invention, moreover, there is provided a battery device constructed so that an enclosure surrounding the battery units arranged in rows and defining the coolant flow path is provided, the coolant flow path having a sectional area which is reduced from the upper-stream side to the lower-stream side, whereby the flowing speed of the coolant on the lower-stream side is increased so that the coolant temperature on the lower-stream side is increased to enhance the heat transfer ability (cooling efficiency) correspondingly.

According to the present invention, moreover, there is provided a battery device constructed so that the wall of an enclosure surrounding the battery units arranged in rows and defining the coolant flow path is formed with auxiliary coolant intake ports through which the coolant is introduced into intermediate portions of the coolant flow path, whereby the coolant temperature on the lower-stream side is lowered, and the heat transfer ability (cooling efficiency) on the lower-stream side is enhanced by utilizing pressure differences in the coolant.

According to the present invention, furthermore, there is provided a battery device constructed so that the enclosure is provided with a bypass channel through which the coolant is introduced into the auxiliary coolant intake ports, whereby a low-temperature coolant can be securely introduced into the region on the lower-stream side.

According to the present invention, moreover, there is provided a battery device constructed by combining the above-described structures.

Preferably, according to the present invention, the sectional area of the coolant flow path defined by the enclosure is narrowed on the lower-stream side by reducing the width of the enclosure, surrounding the battery units arranged in rows and defining the coolant flow path, from the upper-stream side to the lower-stream side, and the battery units in the individual rows in the coolant flow direction are arranged in regions of the enclosure at which regions the width of the enclosure is divided equally. Further preferably, according to the present invention, a dummy for keeping the width of the coolant flow path around the individual battery units substantially uniform is provided in the region for the staggered triangular arrangement of the battery units, whereby the coolant flow path can be prevented from being undesirably widened by the staggered triangular arrangement.

BRIEF DESCRIPTION OF THE DRAWINGS

FIG. 5A is a plan view showing an outline of a battery device according to a second embodiment of the present invention and an array configuration of a plurality of battery units therein;

FIG. 5B is a diagram showing battery characteristics of the battery device shown in FIG. 5A;

FIG. 6A is a plan view showing an outline of a battery device according to a third embodiment of the present invention and an array configuration of a plurality of battery units therein;

FIG. 6B is a diagram showing battery characteristics of the battery device shown in FIG. 6A;

BEST MODE FOR CARRYING OUT THE INVENTION

For a further detailed description of the present invention, embodiments of a battery device according to the present invention will now be described with reference to the drawings.

Figure 1:
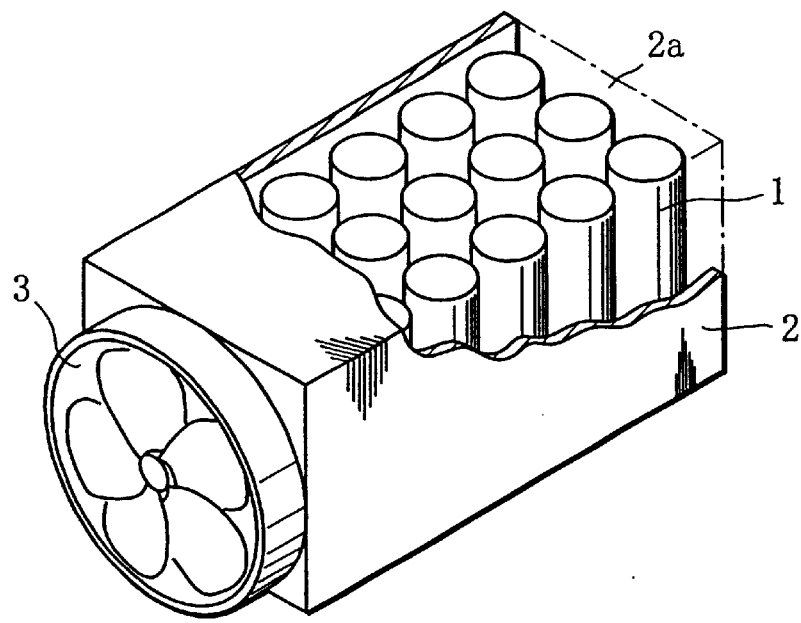
FIG. 1 is a perspective view of an outline of a battery device realized by arranging a plurality of battery units, with part of an enclosure broken away.
Figure 2A:
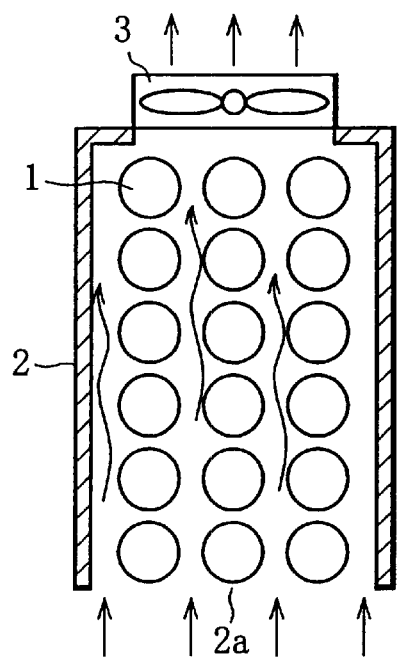
FIG. 2A is a plan view showing an array configuration of the battery units in the battery device shown in FIG. 1.
Figure 2B:
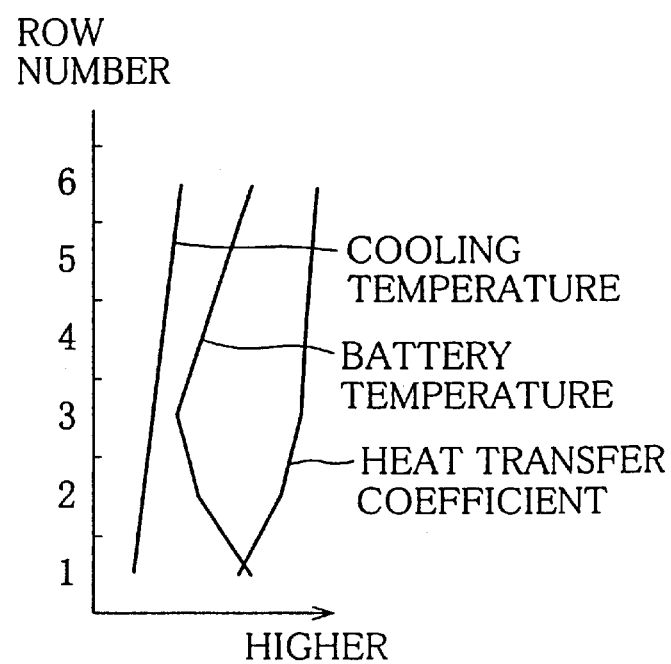
FIG. 2B is a diagram showing battery characteristics of the battery device shown in FIG. 2A.
Figure 3A:
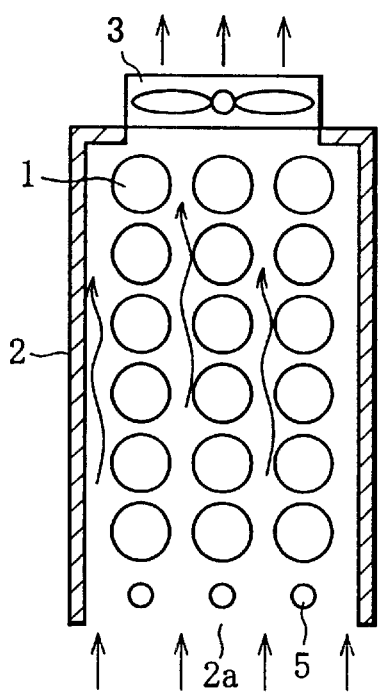
FIG. 3A is a plan view showing an outline of a battery device according to a first embodiment of the present invention and an array configuration of a plurality of battery units therein.
Figure 3B:
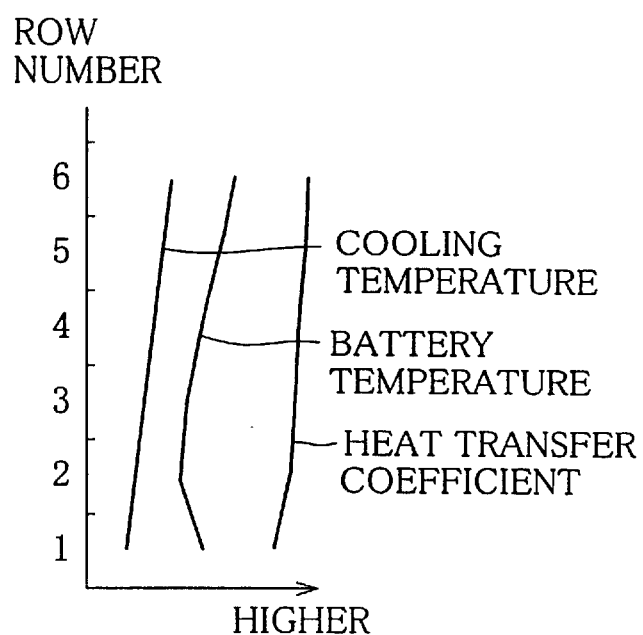
FIG. 3B is a diagram showing battery characteristics of the battery device shown in FIG. 2A.

FIGS. 3A and 3B show a first embodiment. FIG. 3A is a schematic plan view showing a battery structure, and FIG. 3B is a diagram showing battery characteristics. A battery device shown in FIG. 3, which basically resembles the aforementioned battery device shown in FIGS. 1 and 2A, is constructed in a manner such that cylindrical battery modules 1, e.g., 18 in number, each including a plurality of battery cells connected in series as battery units by welding or the like and a protective heat-shrinkable tube externally covering the cells, are arranged at given spaces in a 3-column, 6-row rectangular matrix in a box-shaped enclosure 2. Air for use as a coolant flows in the enclosure 2 along the respective peripheral surfaces of the battery modules 1 in the direction of arrangement of the battery modules 1.

In this case, air is caused to flow between one and the other end openings of the enclosure 2 by means of a fan 3 that is attached to the one end opening. As in a battery device mounted in an electric vehicle, airflow produced as the car runs may be utilized as a coolant. In the case where cooling water, cooling oil, or fluorocarbon is used as the coolant, the coolant may be circulated in the enclosure 2 by means of a pump in place of the fan.

The battery device according to this embodiment is characterized in that turbulence accelerators 5 are arranged in an opening 2a as a coolant intake port of the enclosure 2, that is, on the upper-stream side of a coolant flow path that is defined by the enclosure 2, so as to be situated on the upper-stream side of the battery modules 1 that are located on the uppermost-stream side (in a first row). The turbulence accelerators 5, which are formed of a cylinder each, for example, serve to disorder airflows (coolant flows) that are introduced through the opening 2a and guided onto the respective peripheral surfaces of the battery modules 1 in the first row. Therefore, the turbulence accelerators 5 may be any other means than the cylinders that can disorder the airflows (coolant flows), e.g., dummy battery modules that are kept inoperative in the battery device or circuit components, such as cylindrical capacitors, incorporated in the battery device. Alternatively, the turbulence accelerators 5 may be rod-shaped protrusions or some other structures that constitute part of the enclosure 2. The turbulence accelerators 5 need not always have the same shape as the battery modules 1. It is to be understood that the battery modules 1 may be cylindrical and that the turbulence accelerators 5 on the upper-stream side may be formed in the shape of a prism or plate each. In contrast with this, cylindrical turbulence accelerators 5 may be provided for prism-shaped battery modules 1.

According to the battery device constructed so that the turbulence accelerators 5 are situated on the upper-stream side of the first-row battery modules 1 that are located on the upper-stream side with respect to the coolant flow direction, the airflows (coolant flows) introduced into the enclosure 2 through the opening 2a of the enclosure 2 are disordered by the turbulence accelerators 5. The disordered airflows are guided onto the respective peripheral surfaces of the first-row battery modules 1. In consequence, the heat transfer ability between the airflows and the first-row battery modules 1 can be enhanced to an extent substantially equal to that of the battery modules 1 in a second row and its subsequent rows, whereby the cooling efficiency can be improved. Since the airflows disordered by the battery modules 1 situated on the upper-stream side are guided to the battery modules 1 in the second and subsequent rows, the heat transfer ability for the battery modules 1 in these rows is also high enough.

In consequence, the heat transfer ability for the first-row battery modules 1 is high enough, as shown in FIG. 3B, so that the battery temperature of the first-row battery modules 1 can be restrained from increasing, and differences in battery temperature between the battery modules 1 in the individual rows can be lessened. With use of only a simple construction in which the turbulence accelerators 5 are located on the upper-stream side of the first-row battery module 1, the temperature differences between the battery modules 1 in the individual rows can be effectively lessened, and the overall battery properties can be improved and stabilized.

Figure 4A:
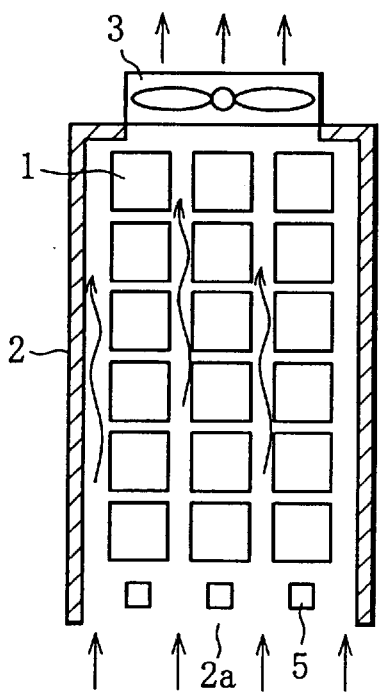
FIG. 4A is a view showing a modification of the battery device shown in FIG. 2A.
Figure 4B:
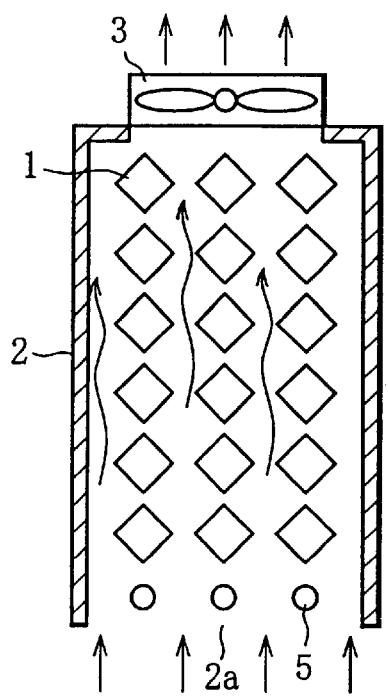
FIG. 4B is a view showing another modification of the battery device shown in FIG. 2A.

The battery modules 1 are not limited to ones having the aforesaid cylindrical shape, and may be prism-shaped ones, such as the ones shown in FIG. 4A. If prism-shaped battery modules 1 are arranged with their respective side faces trued up in the airflow direction, as shown in FIG. 4A, pressure loss can be lessened although the heat transfer ability is not very high. In the case where the prism-shaped battery modules 1 are arranged at an angle to the airflow direction, as shown in FIG. 4B, pressure loss is substantial, however, the heat transfer ability can be enhanced since the airflows are disordered. In this case, if the prism-shaped battery modules 1 are arranged in an in-line rectangular matrix, the whole battery device is large-sized. It is to be desired, therefore, that the modules 1 should be arranged in a staggered triangular matrix.

With the intention of enhancing the heat transfer ability (cooling efficiency) between air and battery modules 1 by disordering airflows, a battery device may be constructed as shown in FIG. 5A. The embodiment shown in FIG. 5A is characterized in that battery modules 1 in, for example, first to fourth rows, which are located in an enclosure 2 on the upper-stream side in the airflow direction, are arranged in an in-line rectangular matrix, while battery modules 1 in the remaining two rows on the lower-stream side are arranged in a staggered triangular matrix.

More specifically, the battery modules 1 in the fifth row on the lower-stream side are staggered for half the arrangement pitch of the battery modules 1, with respect to the battery modules 1 in the fourth row on the upper-stream side thereof, in a direction (crosswise direction) perpendicular to the airflow direction. Likewise, the battery modules 1 in the sixth row on the lower-stream side are further staggered with respect to the battery modules 1 in the fifth row on the upper-stream side thereof. Thus, these battery modules 1 are arranged in a staggered triangular matrix.

In this case, the battery modules 1 in the row staggered for half the arrangement pitch in the crosswise direction are fewer by one than those in any of the other rows since the size (width) of the enclosure 2 is restricted. Accordingly, the width occupied by the battery modules 1 is much smaller than the width defined by the enclosure 2, so that the width for the passage of air is too large unless any modification is made. In the battery device shown in FIG. 5A, therefore, semicylindrical dummies 6 are arranged in positions in which the battery modules 1 are to be located originally, in order to prevent an airflow path between the wall of the enclosure 2 and the battery modules 1 that are staggered for half the pitch from widening, whereby the width of the airflow path between the battery modules 1 is made uniform.

The dummies 6 may be realized in the form of protuberances that protrude from the wall of the enclosure 2. Alternatively, equivalent dummies 6 may be realized by using circuit components such as capacitors incorporated in the battery device.

According to the battery device constructed in this manner, a plurality of battery modules 1 are arranged in a staggered triangular matrix on the lower-stream side of airflow path, so that the airflows flow in zigzags between these battery modules 1, and therefore, these airflows are disordered to a higher degree. In consequence, the heat transfer ability for the staggered battery modules 1 on the lower-stream side can be further enhanced. Thus, the temperature of the coolant is higher on the lower-stream side, as shown in FIG. 5B, so that the battery temperature of the battery modules 1 can be restricted to a low level by increasing the heat transfer ability on the lower-stream side correspondingly.

Even in the case where the battery modules 1 on the lower-stream side are arranged in a staggered triangular matrix, it is advisable to locate turbulence accelerators 5 on the upper-stream side of first-row battery modules 1, as shown in FIG. 6A. By doing this, an effect of the staggered triangular arrangement of the battery modules 1 on the lower-stream side for the improvement of the heat transfer ability can be combined with an effect of the turbulence accelerators 5 for the improvement of the heat transfer ability for the battery modules 1 on the upper-stream side. Thus, temperature differences between the battery modules 1 in all the rows from the upper-stream side to the lower-stream side can be effectively restrained, as shown in FIG. 6B.

Figure 7A:
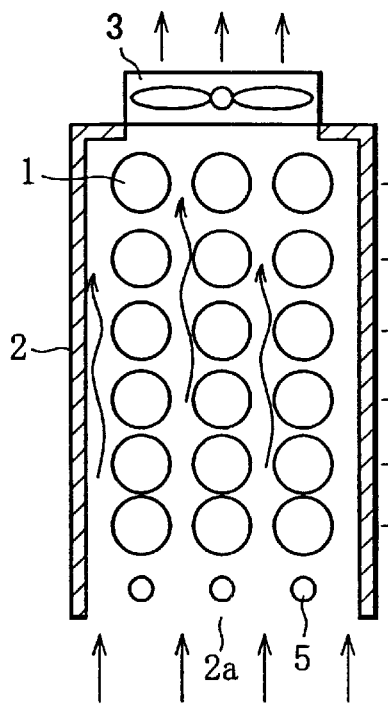
FIG. 7A is a plan view showing an outline of a battery device according to a fourth embodiment of the present invention and an array configuration of a plurality of battery units therein.

The heat transfer ability for battery modules 1 in each row can be made higher on the lower-stream side by setting the arrangement pitches, as viewed in the airflow direction, of the battery modules 1 in an enclosure 2 narrower on the upper-stream side and wider on the lower-stream side, as shown in FIG. 7A. More specifically, as shown in FIG. 7A, arrangement pitches P1 to P5 of the battery modules 1 in the airflow direction are gradually widened so that a larger quantity of airflow acts on the peripheral surfaces of the battery modules 1 on the lower-stream side, whereby the heat transfer ability (cooling efficiency) is enhanced. Even in this case, it is advisable to locate turbulence accelerators 5 on the upper-stream side of first-row battery modules 1.

Figure 7B:
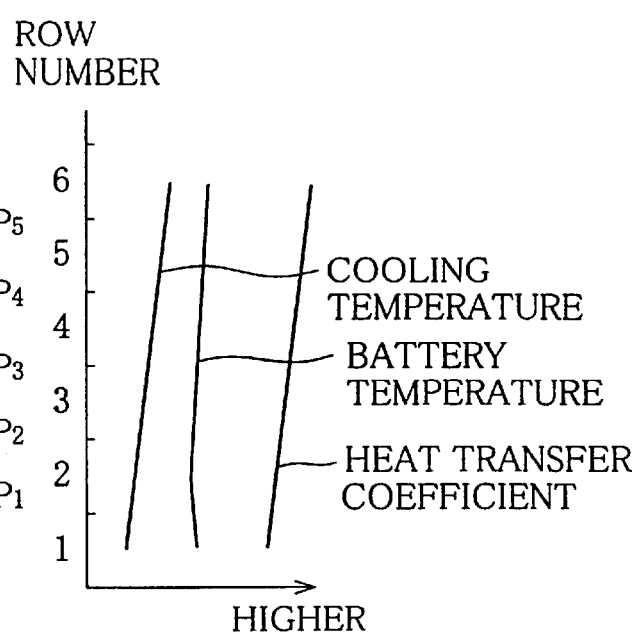
FIG. 7B is a diagram showing battery characteristics of the battery device shown in FIG. 7A.

If a plurality of battery modules 1 are arranged so that the arrangement pitch of the battery modules 1 in the airflow direction is wider on the lower-stream side, the air temperature increases on the lower-stream side, so that the heat transfer ability on the lower-stream side increases correspondingly, as shown in FIG. 7B. Accordingly, the overall temperature difference between the battery modules 1 can be restricted without regard to the side, upper-stream or lower-stream, on which the battery modules 1 are arranged with respect to the airflows.

Figure 8A:
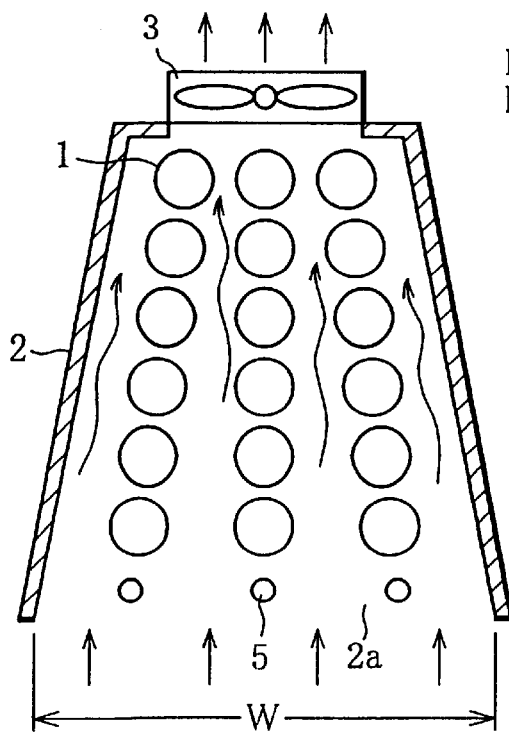
FIG. 8A is a plan view showing an outline of a battery device according to a fifth embodiment of the present invention and an array configuration of a plurality of battery units therein.

As shown in FIG. 8A, on the other hand, the width of an enclosure 2 may be reduced from the upper-stream side to the lower-stream side in the airflow direction so that the sectional flow area of the enclosure is narrower on the lower-stream side. In this case, it is advisable to set the crosswise arrangement pitch of battery modules 1 in each row according to the width of the enclosure 2 so that the battery modules 1 in each row can equally receive cooling action by the airflows. Even in the case where this structure is employed, it is to be desired that turbulence accelerators 5 should be located on the upper-stream side of first-row battery modules 1.

Figure 8B:
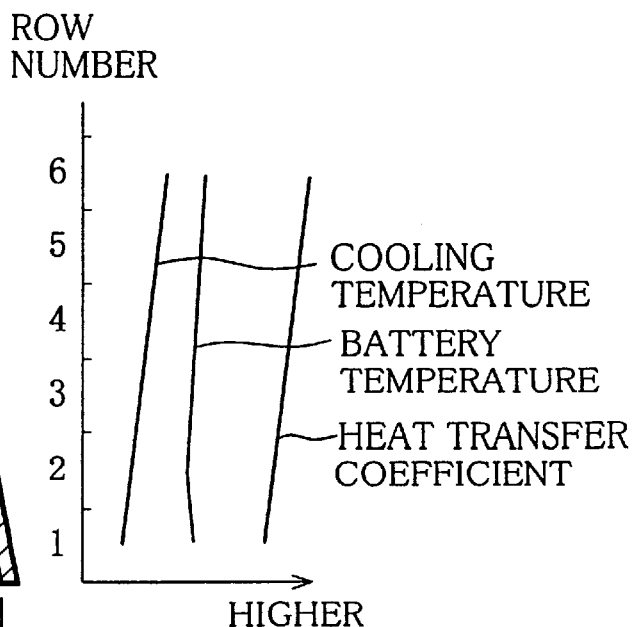
FIG. 8B is a diagram showing battery characteristics of the battery device shown in FIG. 8A.

Thus, according to this battery structure, the sectional flow area for the airflows is narrowed down on the lower-stream side, so that the airflows faster and its heat transfer ability is enhanced correspondingly. In consequence, the air temperature is higher on the lower-stream side, so that the cooling efficiency can be enhanced correspondingly. Accordingly, the general temperature difference between the battery modules 1 can be restricted, as shown in FIG. 8B. In this case, in particular, the aforesaid turbulence accelerators 5 function effectively, so that synergism can be expected of them.

The individual embodiments described above relate to battery structures in which the temperature differences between the battery modules 1 arranged in a plurality of rows are reduced by controlling the airflows by means of the turbulence accelerators 5 and by elaborately arranging the battery modules 1. Alternatively, the temperature of the airflows introduced into the enclosure 2 may be positively changed.

Figure 9A:
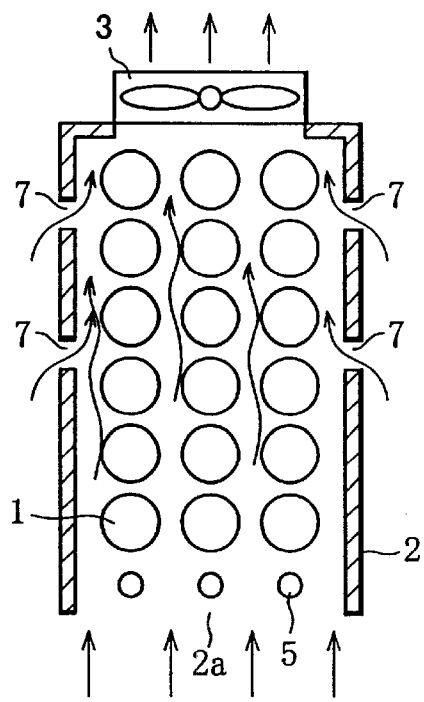
FIG. 9A is a plan view showing an outline of a battery device according to a sixth embodiment of the present invention and an array configuration of a plurality of battery units therein.

More specifically, as shown in the schematic view of FIG. 9A, an enclosure 2, receiving a plurality of battery modules 1 and defining airflow paths extending in the direction of arrangement of the battery modules 1, is formed at its side face with auxiliary coolant intake ports 7 through which air is introduced into intermediate portions of the airflow paths. The air temperature on the lower-stream side is positively lowered by means of the air introduced through the auxiliary coolant intake ports 7, whereby the cooling efficiency of the battery module on the lower-stream side can be enhanced. Naturally, in this case, it is advisable to locate turbulence accelerators 5 on the upper-stream side of first-row battery modules 1.

Figure 9B:
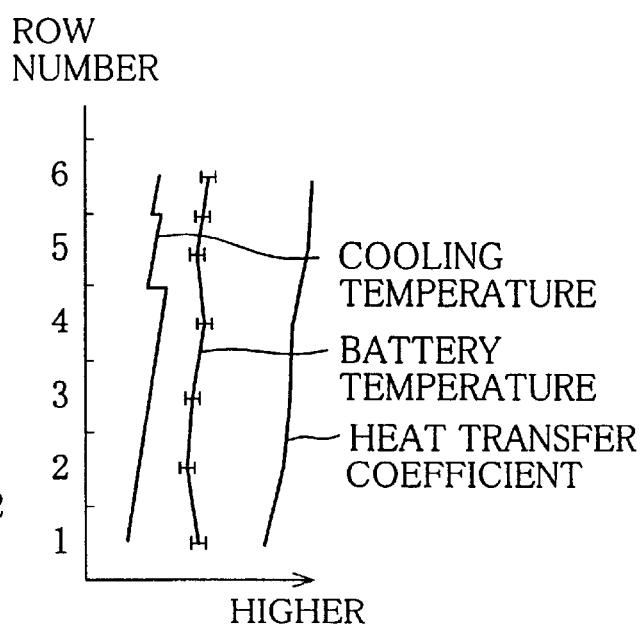
FIG. 9B is a diagram showing battery characteristics of the battery device shown in FIG. 9A.

With this arrangement, an increased temperature of air provided for cooling the battery modules 1 on the upper-stream side can be lowered by mixing the air introduced through the auxiliary coolant intake ports 7 therewith. As shown in FIG. 9B, therefore, the temperature of the battery modules 1 on the lower-stream side can be effectively restrained from increasing, so that the general temperature difference can be restrained. Since fresh air is introduced into airflows in the middle through the auxiliary coolant intake ports 7 the airflow rate on the lower-stream side can be increased to enhance the cooling efficiency by differentiating the airflow rate on the upper-stream side of the auxiliary coolant intake ports 7 from that on the lower-stream side.

Since the auxiliary coolant intake ports 7 are formed in the wall of the enclosure 2 in the structure described above, air near the wall is subjected to a greater effect of temperature fall than air in the central portion of the enclosure 2 is. Inevitably, therefore, some temperature difference is caused between the battery modules 1 that are located near the auxiliary coolant intake ports 7 and the battery modules 1 that are located apart from the auxiliary coolant intake ports 7 in the central portion of the enclosure 2, as shown in FIG. 9B that also shows the dispersion characteristic of the battery temperature.

Figure 10A:
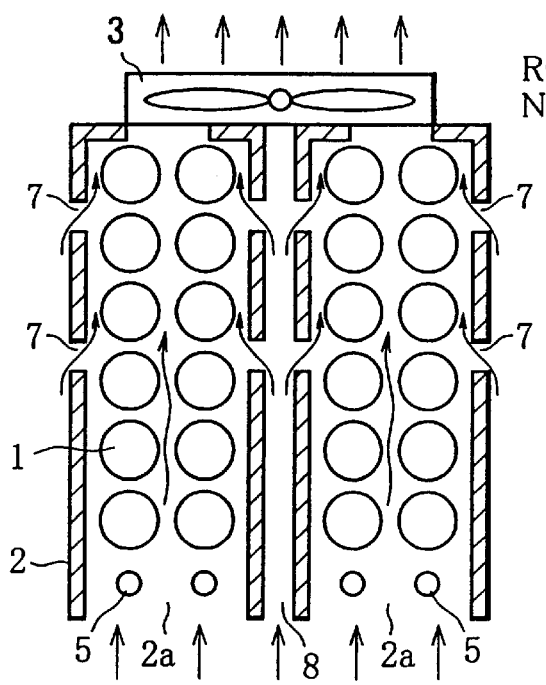
FIG. 10A is a plan view showing an outline of a battery device according to a seventh embodiment of the present invention and an array configuration of a plurality of battery units therein.
Figure 10B:
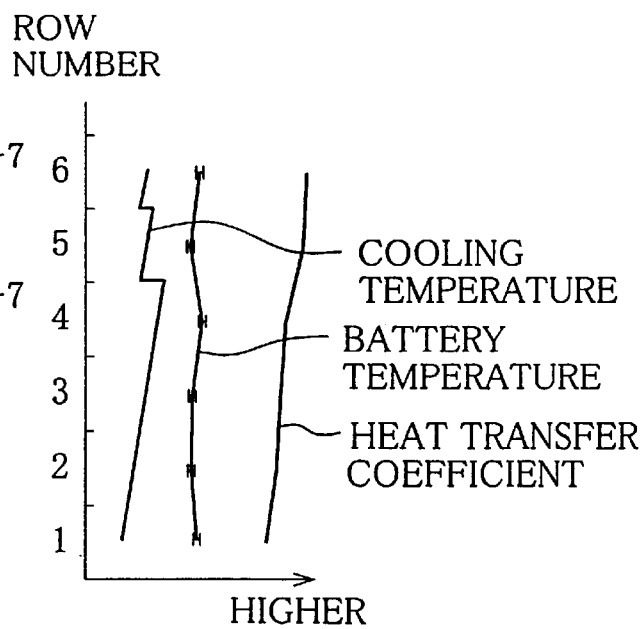
FIG. 10B is a diagram showing battery characteristics of the battery device shown in FIG. 10A.

In the case where the temperature difference between the battery modules 1 near the wall of the enclosure 2 and in the central portion of the enclosure 2 is taken into consideration, therefore, a bypass channel 8 for direct introduction of the outside air should be provided in the central portion of the enclosure 2, as shown in FIG. 10A, for example. In this arrangement, the air can be introduced into the lower-stream portion of the airflow path through the bypass channel 8 and the auxiliary coolant intake ports 7. In the case where four or more rows of battery modules 1 are arranged in the enclosure 2, in particular, by introducing the outside air into regions near the battery modules 1 in the central portion of the enclosure 2 through the bypass channel 8, dispersion of the battery temperature of the battery modules 1 in each row can be effectively restrained, as shown in FIG. 10B that shows the dispersion characteristic of the battery temperature.

Thus, according to the battery devices with the battery structures according to the embodiments described above, the temperature differences between a plurality of battery modules 1 arranged in the enclosure 2 can be restrained, so that stable operation can be carried out with the battery performance of the battery modules 1 kept substantially unchanged. In consequence, troubles, such as lowering of the properties of specific battery modules 1 attributable to the temperature differences, shortening of their battery life compared with those of the other battery modules 1, etc., can be prevented. In the case of, for example, secondary batteries whose change and discharge characteristics are greatly influenced by change of the battery temperature, in particular, dispersion of the temperature of battery modules 1 that are formed of secondary batteries can be restrained, so that stable operation can be expected. Thus, the secondary batteries are suitable power sources for electric vehicles and the like.

The present invention is not limited to the embodiments described above. For example, a battery device can be realized by suitably combining two or more technical means including the location of the turbulence accelerators 5, staggered triangular arrangement of the battery modules 1 on the lower-stream side, enlargement of the arrangement pitch, as viewed in the coolant flow direction, of the battery modules 1 on the lower-stream side, narrowing of the sectional area for coolant flow on the lower-stream side, introduction of the coolant into the intermediate portions of the coolant flow path, and introduction of the coolant through the bypass channel. Further, the battery modules 1 may be stacked in layers to be arranged three-dimensionally in the enclosure 2 instead of being arranged two-dimensionally. In this case also, the array, arrangement pitch, etc. may be set in the aforesaid manner.

Although the battery devices have been described herein as structures that are formed by arranging a plurality of battery modules 1, a battery device may alternatively be realized by arranging a plurality of battery cells or battery packs for use as battery units. Further, the aforesaid air for use as the coolant may be replaced with a coolant gas or cooling oil that is circulated to and from a specified heat exchanger. Furthermore, the number of battery units arranged in the enclosure 2 and the numbers of columns and rows of the array may be set according to specifications. Besides, various modifications may be effected in the present invention without departing from the spirit of the invention.

Industrial Applicability

According to the present invention, as described above, the temperature differences between the battery units are restricted by controlling the coolant flow, so that stable battery operation can be ensured. Since the turbulence accelerators are used to disorder the coolant flow, thereby enhancing the ability of heat transfer between the battery units and the coolant, in particular, dispersion of the battery temperature can be restrained easily and effectively. Since the heat transfer ability on the lower-stream side is enhanced by elaborately arranging the battery units, an increase of the coolant temperature on the lower-stream side can be effectively compensated to restrain the dispersion of the battery temperature. Since the heat transfer ability is enhanced by narrowing down the sectional flow area for the coolant and by introducing the coolant into the intermediate portions of the coolant flow paths, the dispersion of the battery temperature can be effectively restrained, so that great practical effects, such as stabilization of the battery properties, can be obtained despite the use of the simple construction. Thus, the device of the invention can be suitably used as a driving energy source for an electric vehicle or the like.

What is claimed is:

1. A battery device having therein a plurality of battery units arranged in rows at given spaces and a coolant flow path extending around the battery units in a direction of arrangement thereof, wherein:

battery units which are located in a plurality of rows on an upper-stream side of said coolant flow path are arranged in an in-line rectangular matrix, and battery units which are located in a row or in a plurality of rows on a lower-stream side of said coolant flow path are arranged in a staggered triangular matrix.

2. A battery device according to claim 1, wherein:

an arrangement pitch, as viewed in a coolant flow direction, of the battery units which are disposed on an upper-stream side of said coolant flow path is shorter than an arrangement pitch, as viewed in the coolant flow direction, of the battery units which are disposed on a lower-stream side of said coolant flow path.

3. A battery device according to claim 1, wherein:

an enclosure surrounding said battery units arranged in rows and defining said coolant flow path is provided, said coolant flow path having a sectional area which is reduced from an upper-stream side to a lower-stream side.

4. A battery device according to claim 1, wherein:

a wall of an enclosure surrounding said battery units arranged in rows and defining said coolant flow path is formed with auxiliary coolant intake ports through which a coolant is introduced into intermediate portions of said coolant flow path.

5. A battery device according to claim 1, wherein:

a wall of an enclosure surrounding said battery units arranged in rows and defining said coolant flow path is formed with auxiliary coolant intake ports through which a coolant is introduced into intermediate portions of said coolant flow path, the wall being formed with a bypass channel through which the coolant is introduced into said auxiliary coolant intake ports.

6. A battery device according to claim 1, wherein said battery units are each formed of a battery cell, a battery module formed by combining and integrating a plurality of battery cells, or a battery pack including a battery module and an electronic circuit integrally incorporated therein.

7. A battery device according to claim 3, wherein a sectional area of the coolant flow path defined by said enclosure is set by reducing a width of the enclosure, surrounding said battery units and defining said coolant flow path, from the upper-stream side to the lower-stream side, and the battery units in the individual rows in the coolant flow direction are arranged in regions of said enclosure at which regions the width of said enclosure is divided equally.

8. A battery device according to claim 1, wherein a dummy for keeping a width of said coolant flow path around the individual battery units substantially uniform is provided in a region for the battery units arranged in the staggered triangular matrix.

* * * * *